(12) United States Patent
Hilton

(10) Patent No.: US 7,301,886 B2
(45) Date of Patent: Nov. 27, 2007

(54) STORAGE DEVICE HAVING A READ CIRCUIT TO DETECT A STORAGE STATE BASED ON INTERACTION BETWEEN A PROBE AND A STORAGE MEDIUM

(75) Inventor: Richard L. Hilton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 535 days.

(21) Appl. No.: 10/842,194

(22) Filed: May 10, 2004

(65) Prior Publication Data

US 2005/0247873 A1    Nov. 10, 2005

(51) Int. Cl.
G11B 7/00    (2006.01)
(52) U.S. Cl. ............................................. 369/126
(58) Field of Classification Search ............. 369/100, 369/126, 124.1, 47.38
See application file for complete search history.

(56) References Cited

U.S. PATENT DOCUMENTS

| 5,345,815 | A | 9/1994 | Albrecht et al. |
| 5,835,477 | A | 11/1998 | Binnig et al. |
| 5,856,967 | A * | 1/1999 | Mamin et al. ............... 369/126 |
| 6,233,206 | B1 | 5/2001 | Hamann et al. |
| 6,370,107 | B1 | 4/2002 | Hosaka et al. |
| 6,466,537 | B1 * | 10/2002 | Kasama et al. .............. 369/126 |
| 6,473,361 | B1 | 10/2002 | Chen et al. |
| 6,665,239 | B1 * | 12/2003 | Takahashi et al. ........ 369/44.23 |

OTHER PUBLICATIONS

Vettiger and Binnig, Scientific American, "The Nanodrive Project," pp. 47-51, 53 (Jan. 2003).

* cited by examiner

Primary Examiner—Nabil Hindi

(57) ABSTRACT

A storage device includes a probe and a storage medium, where the probe is adapted to form perturbations in the storage medium. A read circuit detects a storage state, with the read circuit to receive a first signal representing interaction between the probe and the storage medium. The read circuit derives a second signal based on the first signal, the second signal being a second derivative of the first signal. The read circuit is adapted to detect the storage state based on the second signal.

20 Claims, 4 Drawing Sheets

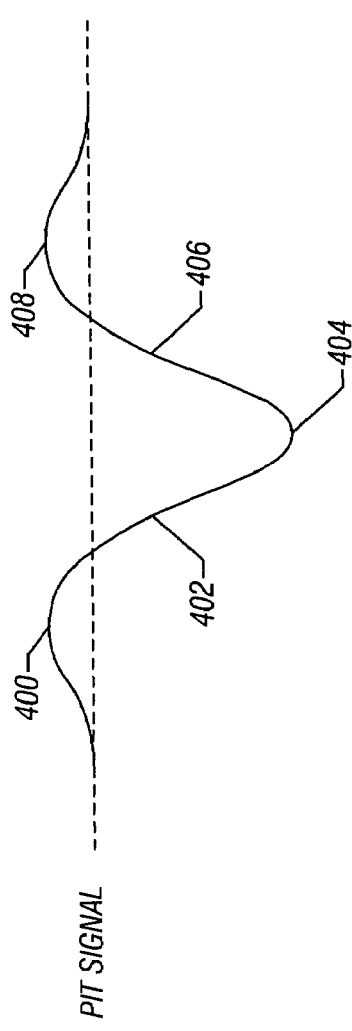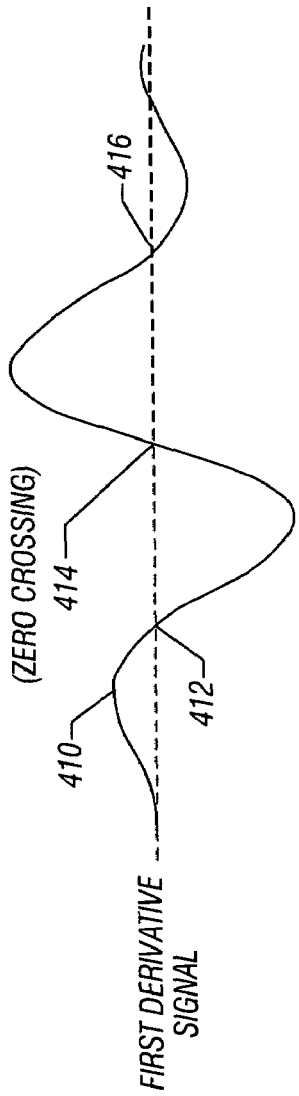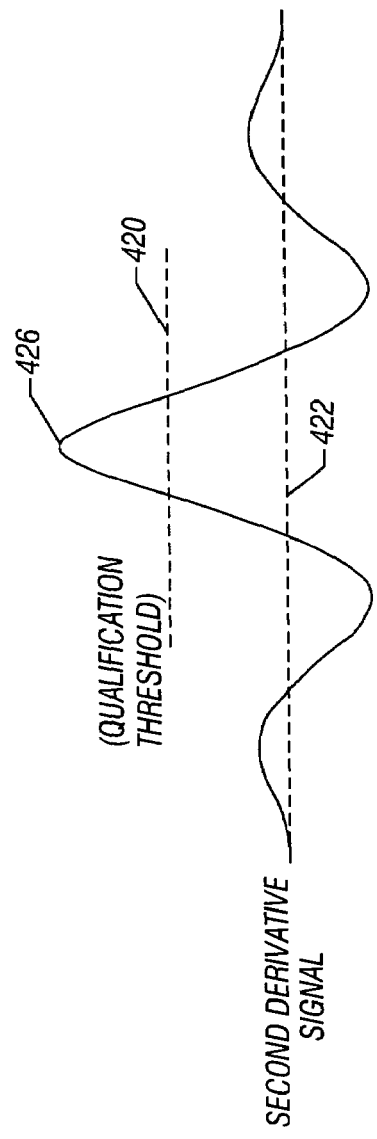

STORAGE DEVICE HAVING A READ CIRCUIT TO DETECT A STORAGE STATE BASED ON INTERACTION BETWEEN A PROBE AND A STORAGE MEDIUM

BACKGROUND

In computing systems, such as desktop computers, portable computers, personal digital assistants (PDAs), servers, and others, storage devices are used to store data and program instructions. One type of storage device is a disk-based device, such as a magnetic disk drive (e.g., a floppy disk drive or hard disk drive) and an optical disk drive (e.g., a CD or DVD drive). Disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device (referred to as "probe-based storage device") is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0."

Effectively, the probe produces a signal that is related to the depth of a dent (lack of a dent is associated with zero depth). For optimal detection of a dent, it is desired that the probe tip be fully engaged in the dent. However, the track followed by a probe tip during a read operation may not follow a track that is aligned with centers of dents formed during write operations. In other words, the track followed by the probe tip during a read is offset from the track followed by the probe tip during a write. The track offset can be caused by several factors, such as shock or vibration during use of the storage device, manufacturing tolerances, and so forth. The track offset results in misalignment between the probe tip and a dent during a read operation. Misalignmnet causes the probe tip to pass close to the edge of a dent, rather than through the center of the dent. If the probe tip passes closer to the edge of a dent than through the center of the dent, then the probe tip may not drop as much into the dent. The shallower depth detected by the probe tip causes the amplitude of the signal produced by the probe to be smaller than if the probe tip is fully engaged within the dent. The smaller signal amplitude is more difficult to detect accurately, particularly in the presence of noise that typically exists in a storage device during operation. To remedy the situation, very tight tolerances may have to be placed on tracks to be followed by probe tips during write and read operations in the storage medium. Such tight tolerances may be difficult to achieve and may result in lower yields and higher manufacturing costs.

BRIEF DESCRIPTION OF THE DRAWINGS

FIGS. 4A-4C are timing diagrams of signals associated with the read circuit of FIG. 2.

DETAILED DESCRIPTION

Figure 1:
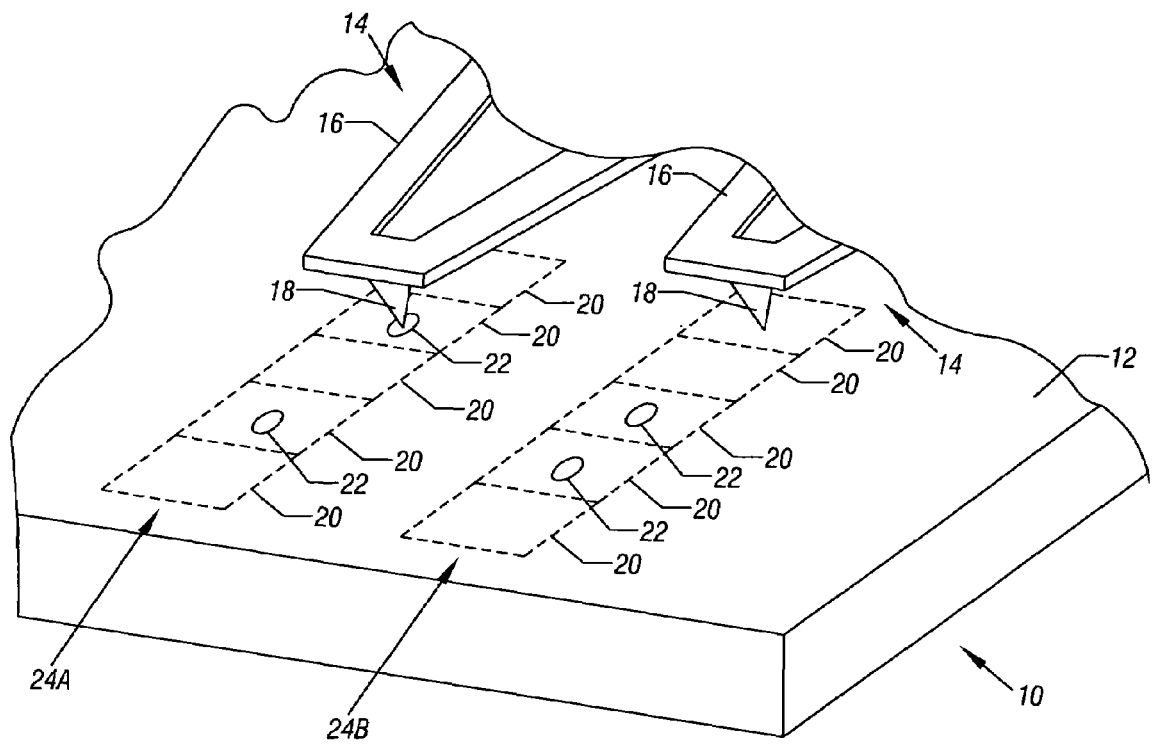
FIG. 1 illustrates a portion of a probe-based storage device having probes to form dents in a storage medium during write operations and to detect for such dents during read operations, in accordance with some embodiments of the invention.

FIG. 1 shows an example probe-based storage device that includes a storage substrate 10 that provides a storage medium. As used here, the term "storage medium" refers to any medium in which storage cells are capable of being formed. The storage medium can make up a portion of the storage substrate 10, or the storage medium can be considered to be the whole storage substrate 10.

The storage medium has a storage surface 12 on which perturbations can be formed by tips 18 of respective probes 14. The tip 18 of each probe 14 is attached to and extends outwardly from a cantilever 16 of the probe 14. According to some embodiments, each probe 14 is a very small probe (on the order of nanometers) that is built using nanotechnology techniques. Such a probe is referred to as a microscopic probe or nanotechnology probe.

FIG. 1 shows an array of storage cells 20. Note that a large number of storage cells 20 can be provided by the storage substrate 10, with a subset of such storage cells 20 shown in FIG. 1 for purposes of illustration. In each storage cell 20, the tip 18 of a probe 14 can cause selective formation of a perturbation, such as a dent 22, which is basically a pit or hole that is formed into the storage medium. In the arrangement of FIG. 1, a first probe 14 is used to interact with storage cells 20 along a first column 24A, whereas a second probe 14 is used to interact with storage cells 20 along a second column 24B. In the first column 24A, dents 22 are formed in two of the depicted storage cells 20, but no dent is formed in the other depicted storage cells 20. In the second column 24B, dents 22 are formed in two of the depicted storage cells 20, with no dent formed in the other depicted storage cells 20. As illustrated in FIG. 1, the tip 18 of the probe 14 in the first column 24A is engaged in a dent 22, whereas the tip 18 of the probe in the second column 24B is engaged on the storage surface 12 but not in a dent.

The presence of a dent 22 in a storage cell represents a first storage state (e.g., logical "1"), while the absence of the dent represents a second storage state (e.g., logical "0"). To write to the storage medium, a probe 14 is scanned along a track across the storage surface 12, with the tip 18 heated and contacted to selected positions on the storage medium to form corresponding dents 22. To read from the storage medium, the probe 14 is also scanned along a track across the storage medium. Detection of whether a dent is present or not in a storage cell 20 is based on a signal (referred to as a "pit signal") that is received from each probe 14. The pit signal has a waveform that corresponds to a geometric profile of the storage surface 12 scanned by the probe along a given track. Effectively, a pit signal represents interaction between a probe 14 and the storage surface 12. If the probe tip 18 is engaged on the storage surface 12 but not in a dent, the pit signal has an amplitude generally within a first range (note that the storage surface 12 is not perfectly flat). The amplitude of the pit signal drops relatively sharply if the probe tip 18 engages a dent 22.

However, the amount of the drop in amplitude of the pit signal varies based on whether the probe tip 18 passes through the center of the dent or passes along a track that is offset from the center of the dent. If the probe tip 18 passes through a track that is offset from the center of the dent (which can be caused by track offset of the probe between write and read operations), then the change in amplitude of the pit signal can be relatively small. Detection of whether or not a dent is present in a storage cell based just on the pit signal can be unreliable as a result of track offset, particularly in a high-noise environment.

In accordance with some embodiments of the invention, signals representing first and second derivatives of the pit signal are calculated and used to determine whether the probe tip has encountered a dent. The first and second derivatives of the pit signal are taken with respect to time, in accordance with some embodiments. Effectively, the first derivative of the pit signal represents a velocity of the probe tip, whereas the second derivative of the pit signal represents an acceleration of the probe tip. By qualifying whether a dent has been encountered based on the first derivative and second derivative of the pit signal, variations in the pit signal resulting from noise can be rejected as indications of the presence of dents. The ability to distinguish between noise and actual engagement by a probe tip with dents allows for more reliable detection of the dents even if the track of the probe tip is offset from a track crossing through centers of the dents.

To create a dent 22, the tip 18 of a probe 14 is locally heated to a predetermined write temperature (e.g., up to about 400° C. or greater) for some amount of time. The heat from the probe tip 18 melts the storage surface 12 at the contact point of the tip 18. When a force is applied onto the probe 14 against the storage surface 12, the tip 18 imprints the dent 22. The applied force can be an incremental, applied force, or alternatively, a constant force due to the elastic nature of the cantilever 16. For example, the storage device can be assembled such that the cantilever 16 is bent back a little and thus applies constant force on the storage surface 12. To enable formation of the dents 22, at least a layer of the storage substrate 10 (the layer adjacent the storage surface 12) is formed of a relatively soft material. An example of such a soft material is polymer (e.g., PMMA or polymethylmethacrylate). Other materials can be used in other embodiments.

Once a dent 22 is formed, the dent can be erased by also using the tip 18. During erase, the tip 18 engages the dent 22, with the tip 18 being heated locally to melt the materials surrounding the dent 22 such that the material flows into the dent 22 to remove the dent. Alternatively, instead of using the tip 18 to erase a dent, a local heat source can be provided underneath the storage medium in the storage substrate 10, with the heat source heated to melt the material surrounding the dent to reflow material back into the dent. Examples of such local heat sources include resistors or other heating elements.

Instead of forming dents 22 in storage cells 20, other types of perturbations that can be created in the surface of the storage medium include creating or altering the topographic features or composition of the storage medium, altering the crystalline phase of the medium, filling or emptying existing electronic states of the medium, creating or altering domain structures or polarization states in the medium, creating or altering chemical bonds in the medium, employing the tunneling effects to move and remove atoms or charge to or from the medium, or storing/removing charge from a particular region.

Such other types of perturbations can also be formed by the probes 14 during write operations, and detected by the probes during read operations. A pit signal provided by each probe corresponds to whether or not the probe has engaged a perturbation.

Figure 2:
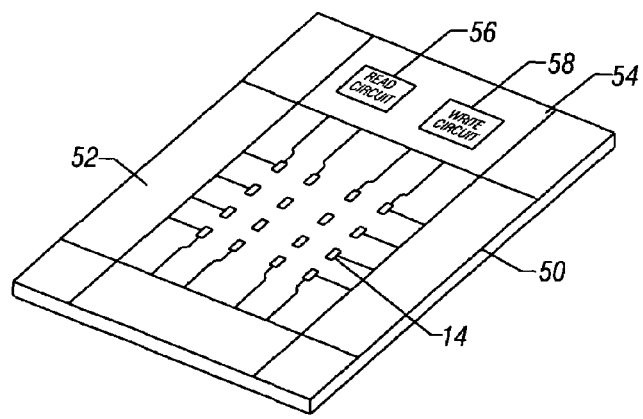
FIG. 2 illustrates a probe substrate in the probe-based storage device of FIG. 1, the probe substrate having an array of probes and read and write circuits according to some embodiments of the invention.

FIG. 2 illustrates a probe substrate 50 that includes an array of probes 14 formed in the substrate 50. Peripheral circuitry 52 and 54 are provided on the peripheral sides of the probe substrate 50. For example, peripheral circuitry 52 and 54 can drive X and Y select lines to select bits of the storage array to read from or write to. A row of probes 14 may be activated by the select lines to read from or write to storage cells that the probes are in contact with. This structure enables concurrent access of multiple cells in one operation, which improves access speeds. Alternatively, one of the probes may be activated to read from or write to one storage cell.

The peripheral circuitry 52 and/or 54 also include a read circuit 56 and write circuit 58. The write circuit 58 causes data to be written by the probe(s) 14 to selected storage cell(s). The read circuit 56 detects pit signals from the probes 14 and converts the pit signals to a digital representation of a logical "0" or a logical "1." As discussed further below, the read circuit 56 calculates first and second derivatives of a pit signal, which are used to determine whether the probe tip has encountered a dent. Detection of a dent is indicated in response to the first derivative signal crossing a zero reference in conjunction with the second derivative signal having an amplitude greater than a predefined threshold. The first derivative signal crossing the zero reference means that the velocity of the probe tip is either going from a negative value to a positive value or from a positive value or negative value. Zero crossing occurs in response to the probe tip reaching the bottom of a dent, for example.

The second derivative signal having an amplitude greater than a predefined threshold means that the acceleration of the probe tip has exceeded a predetermined value. The acceleration of the probe tip is greatest as the probe tip reaches the bottom of a dent. Thus, the combination of the zero crossing of the first derivative signal and the second derivative signal being greater than a predefined threshold allows for more accurate detection of the presence of a dent.

Figure 3:
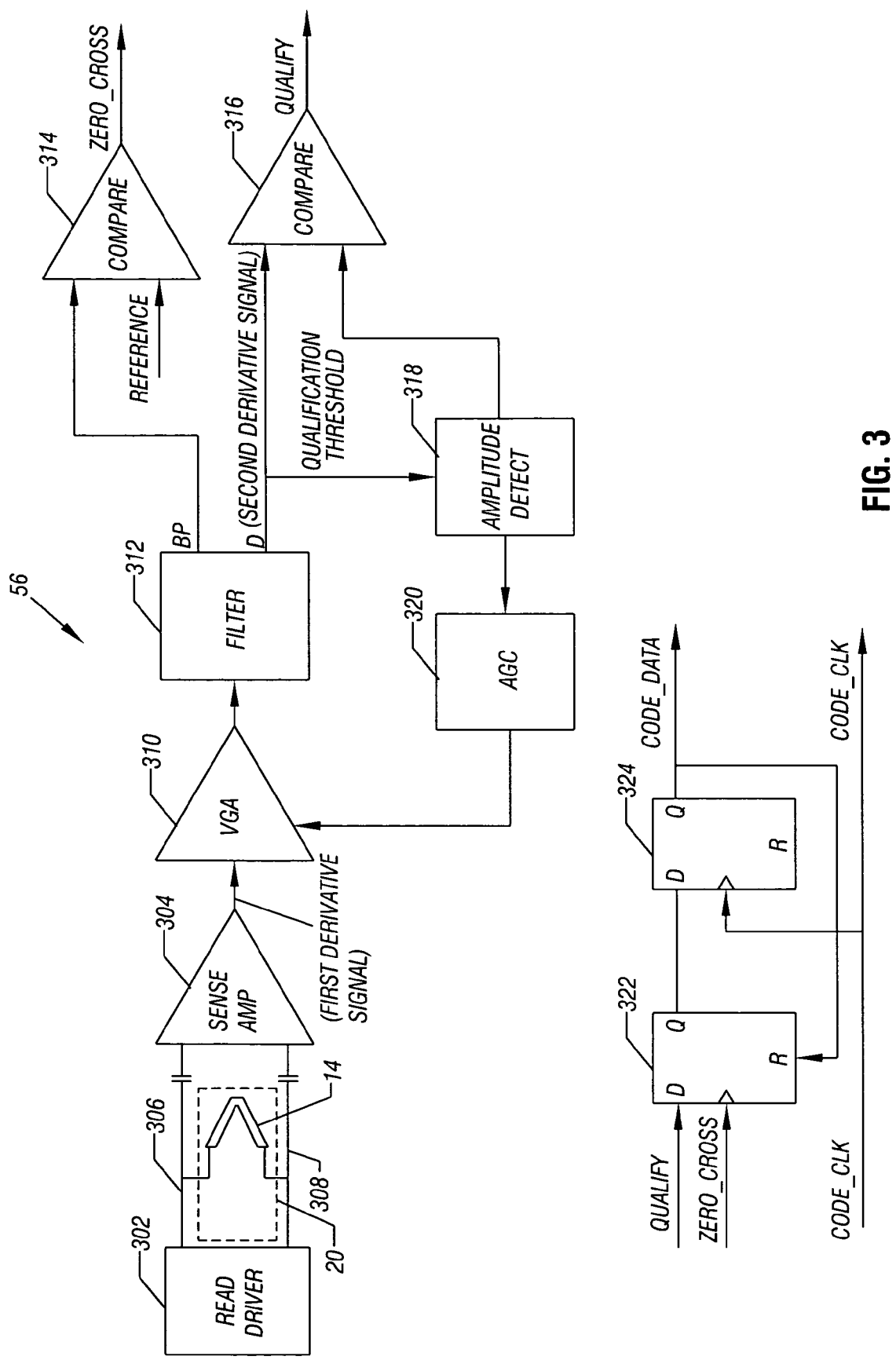
FIG. 3 is a block diagram of a portion of the read circuit of FIG. 2, in accordance with an embodiment.

FIG. 3 is a block diagram of a portion of the read circuit 56. The read circuit 56 is repeated to interact with other probes 14. The read circuit 56 includes a read driver 302 and a sense amplifier 304 that is coupled by signal lines 306 and 308 to the read driver 302. A probe 14 is also coupled to the signal lines 306 and 308. As depicted in FIG. 3, the probe 14 is reading a storage cell 20. The read driver 302 drives an electrical current through the cantilever 16 (FIG. 1) of the probe 14 to cause the probe 14 to rise in temperature during a read operation. The probe 14 is heated to a read temperature (which is less than a write temperature for writing dents in the storage medium).

If the storage cell 20 has a dent, then the tip 18 (FIG. 1) of the probe 14 engages the dent to cause the probe 14 to be in closer proximity to the storage medium. The closer proximity of the probe 14 to the storage medium causes the temperature of the probe 14 to drop further than if the tip 18 (FIG. 1) of the probe 14 is engaged on the storage surface 12 (FIG. 1) but not in a dent. The difference in temperatures of the probe 14 causes the resistance of the signal path running through the probe 14 to be different depending on whether or not the probe tip is engaged in a dent. The difference in resistance of the probe signal path causes different electrical currents to pass through the signal lines 306 and 308.

The signal provided by the signal lines 306 and 308 to the sense amplifier 304 is a pit signal that has an amplitude representing a resistance of the signal path through the probe 14. An example of such a pit signal is depicted in FIG. 4A. The sense amplifier 304 receives the pit signal over signal lines 306 and 308 and produces a first derivative signal that represents a first derivative of the pit signal with respect to time. The first derivate signal produced by the sense amplifier 304 is provided to a variable gain amplifier 310. The gain of the variable gain amplifier 310 is controlled by the output of an automatic gain controller (AGC) circuit 320.

The amplified first derivative signal is provided by the variable gain amplifier 310 to a filter 312, which outputs a Bandpass signal (at the BP output) as well as a second derivative signal (at the D output). The second derivative signal is a second derivative of the pit signal. The second derivative signal is generated by taking a derivative of the first derivative signal with respect to time. The filter 312 applies Bandpass filtering on the first derivative signal to filter out low-frequency and high-frequency noise. The Bandpass signal is provided to one input of a comparator 314. The bandpass signal is compared to a Reference signal to produce a signal labeled Zero_cross. The Zero_cross signal provides an indication of when the first derivative signal crosses a zero reference point (indicated by the Reference signal).

The second derivative signal is provided by the filter 312 to an input of another comparator 316. The comparator 316 compares the second derivative signal with a Qualification Threshold signal, which establishes a threshold (referred to as the qualification threshold) for acceleration of the probe tip. If the acceleration of the probe tip, represented by the second derivative signal, exceeds the Qualification Threshold signal, then the comparator 316 asserts a Qualify signal to an active state to indicate that the acceleration of the probe tip has exceeded the Qualification Threshold signal. The probe tip having an acceleration that is greater than the Qualification Threshold provides a positive indication that the probe tip has in fact encountered a dent.

The Qualification Threshold signal is provided by an amplitude detect circuit 318 to enable adjustment of the Qualification Threshold signal to a level that corresponds to detected amplitudes of received pit signals. In one implementation, the Qualification Threshold signal is set to a level that corresponds to 75% of the average amplitude of calculated second derivative signals. Alternatively, instead of a dynamically adjustable Qualification Threshold signal, a fixed Qualification Threshold signal can be set. The amplitude detect circuit 318 also provides an output to the automatic gain control circuit 320 to enable the automatic gain control circuit 320 to adjust the gain of the variable gain amplifier 310 based on the detected amplitude of the second derivative signal.

The read circuit 56 further includes logic, formed by the flip-flops 322 and 324 (according to one implementation) to generate an indication (labeled a Code_Data signal) to indicate a data state detected by the probe 14. The data input (D) of the flip-flop 322 receives the Qualify signal, while the clock input of the flip-flop 322 receives the Zero_cross signal. The data output (Q) of the flip-flop 322 is connected to the data input (D) of the flip-flop 324. The data output (Q) of the flip-flop 324 produces the Code_Data signal. The Code_Data signal is also provided back to a reset (R) input of the flip-flop 322. The clock input of the flip-flop 324 receives a clock Code_Clk, which is the data reading clock of the read circuit 56. Effectively, the logic containing flips-flops 322 and 324 detects the state of the Qualify signal in response to Zero_cross transitioning from a low to a high state. The Zero_cross signal transitioning from low to high, in combination with the Qualify signal being high, is an indication that the first derivative signal is crossing from a negative value to a positive value, such as when the probe tip has dropped into a dent and is exiting a dent. At the low-to-high transition of the Zero_cross signal, the state of the Qualify signal is loaded into the flip-flop 322 and provided to the data output of the flip-flop 322. On the next rising edge of Code_Clk, the state of the output of flip-flop 322 is loaded into the flip-flop 324 and provided as Code_Data on the output of the flip-flop 324. The Code_Data signal has a high state (logical "1" state) in response to Qualify being asserted to a high state. The Code_Data signal has a low state (logical "0" state) in response to Qualify being at a low state.

FIGS. 4A-4C illustrate timing diagrams of a pit signal received by the sense amplifier 304 (FIG. 3), a first derivative signal generated by the sense amplifier 304, and a second derivative signal generated by the filter 312. FIGS. 4A-4C show waveforms of signals that represent a probe tip entering into a dent and exiting a dent of a storage cell. The dashed line shown in FIG. 4A corresponds generally to a plane of the storage surface 12. Before a probe tip drops into a dent, the probe tip encounters a slightly raised portion that surrounds the dent. The raised portion is indicated by the pit signal exhibiting an increased amplitude (represented by reference numerals 400 and 408). A falling slope 402 of the pit signal represents the probe tip falling into a dent. The bottom of the dent is represented by a bottom point 404 of the pit signal. A rising slope 406 of the pit signal indicates that the probe tip is exiting the dent.

FIG. 4B shows the first derivative signal, which corresponds to the first derivative of the pit signal taken over time. Effectively, the first derivative signal represents the slope of the pit signal taken at each point of the pit signal. The dashed line shown in FIG. 4B represents the zero slope. The pit signal has zero slope in three different locations: point 400, point 404, and point 408 (FIG. 4A). The zero slope locations are indicated by zero crossings 412, 414, and 416 (FIG. 4B). Each time the first derivative signal crosses the zero slope line (represented by the dashed line of FIG. 4B), the Zero_cross signal of FIG. 3, produced by the comparator 314, switches state.

FIG. 4C shows the second derivative signal, which is a derivative taken of the first derivative signal over time. The second derivative signal represents the slope of the first derivative signal, and represents the acceleration of the pit signal of FIG. 4A. A first dashed line 422 shown in FIG. 4C represents zero acceleration. A second dashed line 420 represents a predefined qualification threshold. The maximum acceleration occurs at a point 426 of the second derivative signal, which corresponds to the probe tip dropping to the bottom of the dent of a storage cell. Once the second derivative signal has an amplitude that is greater than the qualification threshold (represented by the dashed line 420), then the Qualify signal (FIG. 3) produced by the comparator 316 is asserted to an active state. The active state of the Qualify signal is loaded into flip-flop 322 on the rising edge of the Zero_cross signal (FIG. 3). As noted above, the loading of an active high Qualify signal into the flip-flop 322 is an indication of detection of a dent.

Detection of the state of a storage cell that is based on signals representing the velocity and acceleration of the probe tip provides superior immunity against noise than detection of a state of the storage cell based on just amplitude of the pit signal alone.

Figure 5:
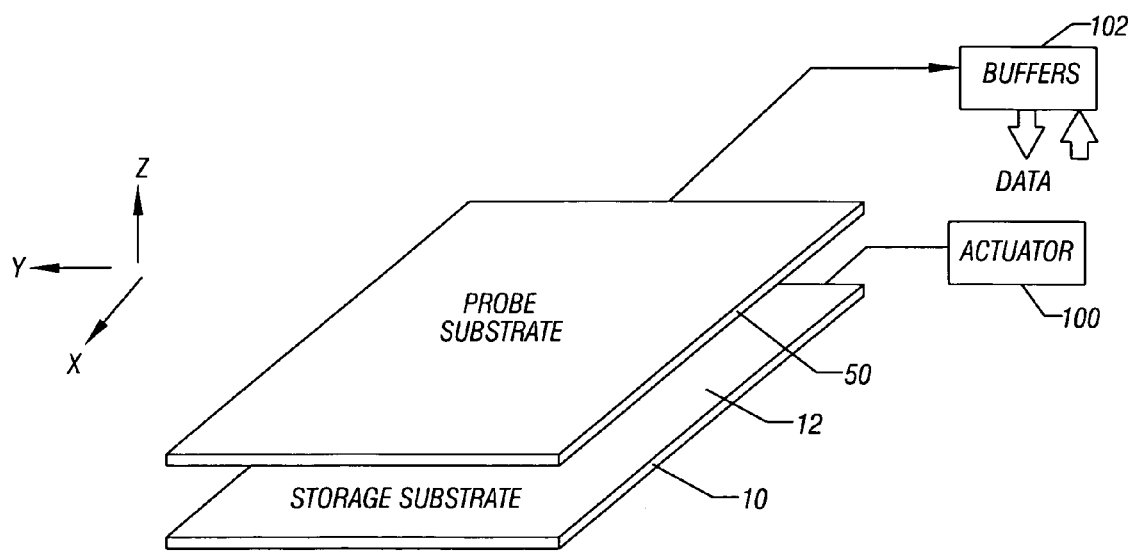
FIG. 5 illustrates the probe substrate positioned to face the storage substrate in the probe-based storage device of FIG. 1.

As shown in FIGS. 1 and 5, the probe substrate 50 is placed with the surface containing the probes 14 facing the storage surface 12 of the storage substrate 10, on which the storage cells are formed. The probe substrate 50 is positioned over the storage substrate 10 so that the probe tips 18 (FIG. 1) of the probes 14 point downwardly to engage the storage surface 12 of the storage substrate 10. In an alternative arrangement, the storage substrate 10 is positioned over the probe substrate 50 so that the probe tips 18 point upwardly to face the storage surface 12. In other arrangements, the probe substrate 50 and the storage substrate 10 can have a side-to-side relationship.

The storage substrate 10, in the example of FIG. 5, is coupled to an actuator 100 that is designed to move the storage substrate 10 in both X and Y directions such that probes 14 (FIG. 1) can be placed over desired storage cells on the storage substrate 10. Data sensed by the probes 14 and read circuit 56 (FIG. 2) is provided to buffers 102, which store output data for retrieval by an external device. The buffers 102 may also store write data to be written to storage cells 20 (FIG. 1) in the storage substrate 10.

Alternatively, the actuator 100 is operatively coupled to move the probe substrate 50, or to move both the probe substrate 50 and the storage substrate 10. The actuator 100 is also able to move the probe substrate 50 and/or the storage substrate 10 in the Z direction, which is generally perpendicular to the X and Y directions.

Figure 6:
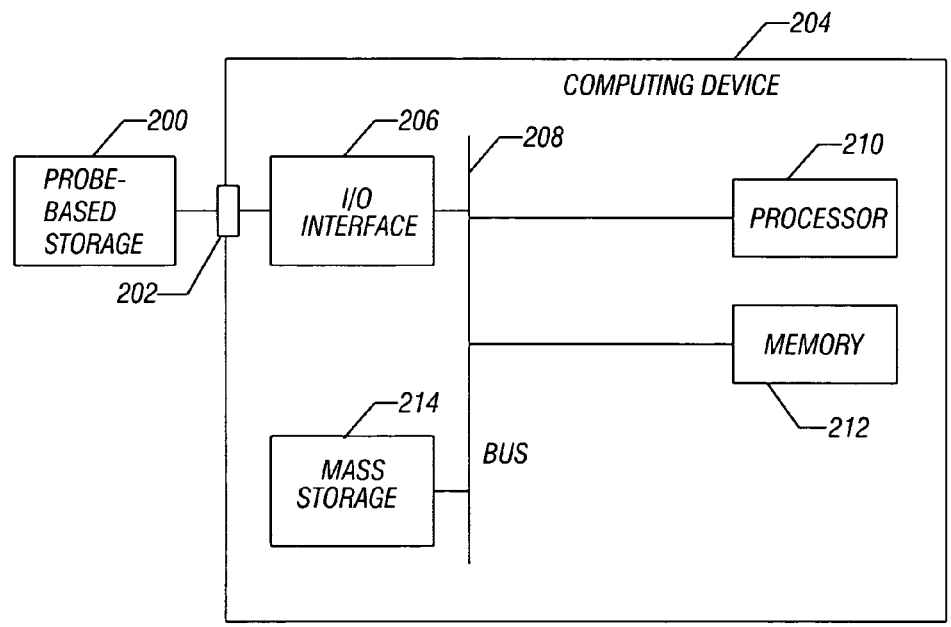
FIG. 6 is a block diagram of a system that includes a computing device having a port to connect to a probe-based storage device that incorporates an embodiment of the invention.

The probe-based storage device according to some embodiments can be packaged for use in a computing system. For example, as shown in FIG. 6, a probe-based storage device 200 that incorporates an embodiment of the invention is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 214. Other components may be included in the computing device 204. The arrangement of the computing device 204 is provided as an example, and is not intended to limit the scope of the invention. In alternative embodiments, instead of being coupled to an I/O port of the computing system, the probe-based storage device can be mounted (directly or through a socket) onto the main circuit board of the computing system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:
   a probe;
   a storage medium, the probe adapted to form perturbations in the storage medium; and
   a read circuit to detect a storage state, the read circuit to receive a first signal representing interaction between the probe and the storage medium, the read circuit to derive a second signal based on the first signal, the second signal being a second derivative of the first signal, wherein the read circuit is adapted to detect the storage state based on the second signal and wherein the read circuit has a sense amplifier to generate a third signal that is a first derivative of the first signal.

2. The storage device of claim 1, wherein the probe has a tip, and wherein the perturbations comprise dents in the storage medium, the first signal having a first amplitude in response to the probe tip engaged in a dent, and the first signal having a second, different amplitude in response to the probe tip engaged on a surface of the storage medium but not in a dent.

3. The storage device of claim 1, wherein the read circuit has a sense amplifier to generate a third signal that is a first derivative of the first signal.

4. The storage device of claim 1, wherein the read circuit has a comparator to indicate whether the third signal has crossed a first threshold representing zero slope of the first signal.

5. The storage device of claim 4, wherein the read circuit further comprises a second comparator to indicate whether the second signal has exceeded a second threshold that represents a predefined acceleration of a tip of the probe.

6. The storage device of claim 5, wherein the read circuit further comprises logic to indicate presence of a dent in response to both the third signal crossing the first threshold and the second signal being greater than the second threshold.

7. The storage device of claim 1, wherein the probe comprises a nanotechnology probe.

8. The storage device of claim 1, wherein the probe has a tip, the first signal having a first amplitude in response to the probe tip engaged with a perturbation, and the first signal having a second, different amplitude in response to the probe tip not being engaged with a perturbation.

9. A system comprising:
   a processor; and
   a storage device coupled to the processor, the storage device comprising:
   a probe having a tip;
   a storage medium having a plurality of storage cells, the probe forming perturbations in selected storage cells; and
   a read circuit to detect storage states of the storage cells based on a first signal representing a velocity of the tip and a second signal representing an acceleration of the tip.

10. The system of claim 9, wherein the perturbations comprise dents formed in the storage medium.

11. The system of claim 10, wherein the probe forms the dents in the storage medium during one or more write operations.

12. The system of claim 9, wherein the read circuit has a sense circuit to receive a third signal representing interaction between the tip and the storage medium, and to generate the first signal based on the third signal.

13. The system of claim 12, wherein the read circuit has logic to indicate that the first signal crosses a first threshold representing zero slope of the third signal.

14. The system of claim 13, wherein the read circuit further comprises logic to indicate that the second signal exceeds a second threshold that represents a predefined acceleration of the third signal.

15. The system of claim 14, wherein the read circuit further comprises logic to indicate presence of a perturbation in a storage cell in response to both the first signal crossing the first threshold and the second signal being greater than the second threshold.

16. A method of storing data in a storage device, comprising:
forming, with a probe, perturbations in selected ones of plural storage cells in a storage medium during one or more write operations;
receiving a first signal representing interaction between the probe and the storage medium during a read operation;
detecting a storage state based on a second signal representing a second derivative of the first signal; and
generating a third signal that is a first derivative of the first signal, wherein detecting the storage state of a storage cell is based on both the second signal and the third signal.

17. The method of claim 16, further comprising: generating a third signal that is a first derivative of the first signal, wherein detecting the storage state of a storage cell is based on both the second signal and the third signal.

18. The method of claim 16, further comprising: indicating presence of a perturbation in a storage cell in response to the third signal crossing a zero reference and the second signal having greater than a predefined value.

19. The method of claim 16, further comprising: heating the probe to a write temperature to form the perturbations, wherein the perturbations comprise dents in the storage medium.

20. The method of claim 19, further comprising: heating the probe to a read temperature less than the write temperature to detect the dents during a read operation.

* * * * *